Patented Jan. 3, 1950

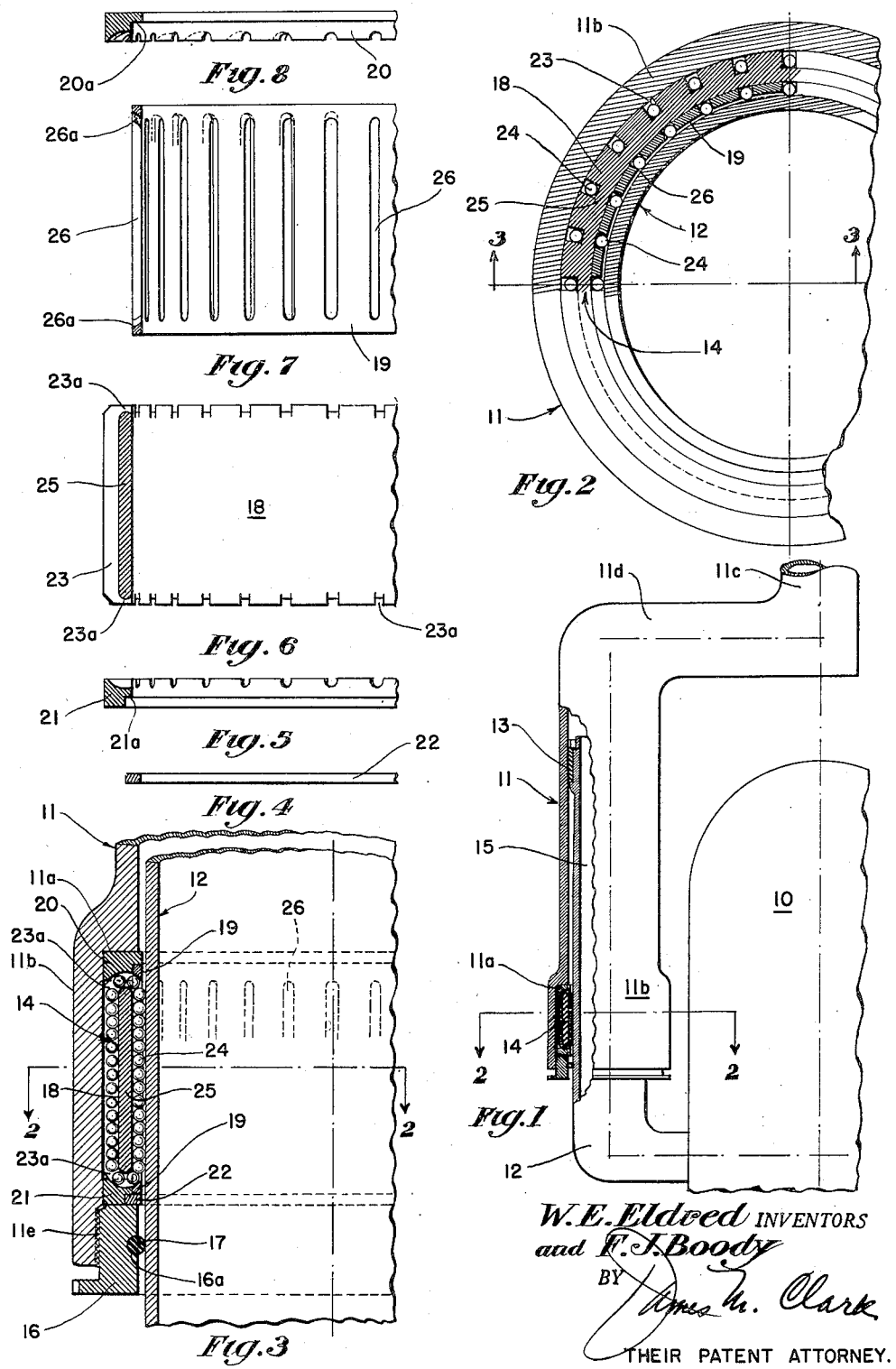

2,493,342

UNITED STATES PATENT OFFICE 2,493,342

OFFSET LANDING GEAR STRUT WITH CONTINUOUSLY CIRCULATING BALL TYPE BEARING

Wendell E. Eldred and Frederick J. Boody, Fort Worth, Tex., assignors to Consolidated Vultee Aircraft Corporation, a corporation of Delaware Application September 18, 1945, Serial No. 617,048

19 Claims. (Cl. 244—104)

1

The present invention relates generally to landing gears and other aircraft components, and more particularly to the application of an improved reciprocating type anti-friction bearing for landing gear struts and similar relatively moving parts.

The construction and use of relatively large and heavy aircraft has been attended by many problems in the design and construction of the necessary shock absorbing struts, and oleo shock struts for the landing gears, and particularly in those installations having offset single cylinder and piston units for each landing wheel. The latter type arrangement usually necessitates an unsymmetrical relationship of the parts. This frequently produces a resulting lateral reaction of such a magnitude that the friction created within the conventional bronze or micarta lower cylinder bushings prevents the reciprocating movement of the piston and cylinder elements. Accordingly by reason of these large lateral reactions at the pistons, the oleo or shock absorbing action is prevented and the intended function of the strut to absorb landing shocks is defeated. These and corollary problems have presented serious difficulties in the design of large aircraft, particularly in low wing designs where the cylinder and piston units are necessarily short in length.

The above and other objections have been largely overcome by the improved reciprocating type bearing of the present invention. A number of prior efforts have been made to provide anti-friction bearings between the piston and the cylinder elements of shock absorbing struts, but none has been sufficiently satisfactory under actual service conditions to warrant very wide use. The improved bearing of the present invention overcomes many of the difficulties met with in these prior bearings and does so essentially by virtue of the novel arrangement of its respective parts which provide axial circulation of the ball elements in an arrangement which permits of high capacity and efficient operation. The arrangement is such that deflections of the relatively moving parts are kept at a minimum, and any tendency toward binding or jamming of the ball elements is substantially prevented.

It is accordingly a primary object of the present invention to overcome the abovementioned prior difficulties and objections by replacing the conventional bushing at the lower end of the strut cylinder with an improved anti-friction bearing. It is a further object to provide in these and similar installations an improved reciprocating type ball bearing of sufficiently high capacity to withstand the high lateral reactions which are met with in offset shock absorbing struts. A further object resides in the provision of a ball bearing having vertical or longitudinally arranged spaces within which the ball elements are capable of continuous circulation in either direction. It is also an object of the present invention to provide an improved relationship of the respective elements in a reciprocating type ball bearing which is capable of operating under conditions of reciprocating, rotating or oscillating movements of the respective piston and cylinder elements, or under a combination of any or all of these movements at the same time. These and other objects will become apparent to those skilled in the art after reading the following description taken together with the accompanying drawings forming a part hereof, in which:

Fig. 1 is a front elevational view of a shock absorbing strut and landing wheel with the strut partially broken away to show a preferred form of our improved bearing construction;

Fig. 2 is a partial cross-sectional view to a larger scale of the strut as taken on the lines 2—2 of Figs. 1 and 3;

Fig. 3 is an enlarged vertical sectional view of the strut bearing as taken along the lines 3—3 of Fig. 2; and Figs. 4 to 8 inclusive represent an exploded cross-sectional view of the several component elements comprising the improved bearing.

Referring now to Fig. 1, the numeral 10 represents a landing wheel which is supported upon an aircraft structure by means of an offset relatively fixed strut portion 11 which is telescopically engaged by the wheel-carrying strut portion 12. The wheel 10 may be either a main landing gear wheel, or a nose- or tail-wheel, and the strut 11 by which it is supported from the aircraft structure, while relatively fixed in the landing position, is preferably arranged such that a greater portion of the landing gear including the wheel 10 is retracted within the aircraft or its wing to reduce its resistance in flight. The fixed strut or cylinder portion 11 preferably has a short upper portion 11c operatively connected to the aircraft structure and the extended axis of which preferably extends through the center of the wheel 10. The strut 11 is also provided with a horizontally offset portion 11d which interconnects in main cylinder portion with the upper portion 11c and terminates at the lower end of its cylinder portion in an enlarged diameter hub 11b.

The wheel-carrying strut 12 is arranged to reciprocate vertically or longitudinally in an axial direction within the cylinder portion of the strut 11. This piston strut 12 may be provided with a conventional bronze or micarta bushing 13 at its upper terminal, and the enlarged hub portion 11b is preferably provided with an improved anti-friction bearing 14 of the present invention. A shock absorbing unit 15 which may preferably be of the oleo shock strut type is provided within and between the respective cylinder 11 and piston 12 and inasmuch as this shock absorber per se does not form a novel feature of the present invention, other than in its general relationship to the improved strut bearing, it has not been shown or described in further detail.

The landing wheel 10 is subjected in landing and taxiing to both vertical loads, which tend to compact or collapse and bend the telescoping struts 11 and 12, and to laterally directed or side loads which have an even greater tendency to bend the telescoped parts. If we assume a lateral load exerted from the left toward the right against the lower side face of the wheel 10, it will necessarily be opposed by a resultant force exerted in the region of the bearing 14 from the right to the left and an appreciably smaller resultant force in the region of the bearing 13 exerted in the same direction as the original disturbing force, namely, from the left toward the right. These forces accordingly tend to produce bending of the cylinder portion 11 at and between these bearings and the resulting friction, particularly at the point of greatest reaction at the lower terminal of the cylinder element 11, substantially precludes the use of conventional bronze or micarta bushings as heretofore used.

The improved bearing to which the present invention is directed, as indicated at 14, is housed within the enlarged diameter lower portion 11b, the inner bore of which is enlarged and terminates at its upper end in the shoulder 11a. The lower portion of the hub 11b is internally threaded at 11e for engagement by the threaded bearing retainer 16. The inner bore of the latter is suitably grooved at 16a to receive an annular seal ring 17 to prevent the escape of lubricating oil from around the piston 12 and to keep the interior of the shock absorber unit free from dust and dirt. While a conventional bushing is indicated at 13 in the region of the upper terminal of the piston element 12 it will be obvious that an improved bearing of the type shown at 14 may be utilized in both the upper and lower positions.

Referring now to Figs. 2 to 8 inclusive, the improved bearing 14 consists of a ball return guide 18, a ball sleeve 19, an upper retainer ring 20, a lower retainer ring 21 and a sleeve retainer ring 22. The upper and lower retaining rings 20 and 21 are each provided with corresponding inner shoulder portions 20a and 21a respectively. The ball return guide 18 is preferably formed in the shape of an elongated annular ring having spaced vertical grooves 23, the width and breadth of the grooves of which are greater than the diameter of the balls 24. These grooves 23 extend radially outwardly through the ends of the guide 18 in such a manner as to form semicircular ends 23a at each end of the remaining integral connecting portions 25. Vertical slots 26 are formed with arcuate ends 26a through the sleeves 19 to conform with the grooves 23 in the guide 18. These slots 26 are preferably slightly wider at the inner surface than the diameter of the ball elements 24, whereas the outer widths are slightly smaller. Moreover, the thickness of the sleeve 19 is somewhat less than the diameter of the ball elements 24 such that the balls bear against both the guide 18 and the piston 12. The circuits or races for the ball elements 24 are completed by the upper and lower retainer rings 20 and 21 which are arcuately and opposingly grooved to match the above described slots 26 and grooves 23.

In assembling the bearing the upper ring 20 is inserted and fitted against the shoulder 11a within the cylinder strut 11. The sleeve 19 is then pressed within the guide 18 with the upper end of the sleeve fitting into the annular shoulder 20b of the upper ring 20. With the piston 12 in place and the assembly inverted the balls 24 may then be placed in each of the angularly spaced inner and outer races. The lower retaining ring 21 is then positioned beneath the guide 23 but it should be noted that it does not support the sleeve 19. This supporting action is, however, accomplished by the annular sleeve retainer 22 which fits into the shoulder 21a in the lower inner corner of the lower retainer ring 21 and extends inwardly under and against the sleeve 19. Both of the lower retaining parts 21 and 22 are supported and maintained in proper position by the bearing retainer 16 which is threaded to the internal wall at 11e within the cylinder terminus portion 11b. Longitudinal keys and keyways may also be provided to prevent relative rotation between 19 on the one hand and 18, 20 and 21 on the other to maintain this proper relationship.

In operation, the ball elements 24 contact and support the outer cylindrical surface of the piston element 12 against the inner surface of the guide 18; whereas the ball elements between the guide 18 and the inner bore of the cylinder hub portion 11b are permitted relatively free movement. Accordingly, as the piston 12 moves axially or telescopically with respect to the cylinder element 11, the ball elements 24 move in an axial direction within the grooves 23 and slots 26 in endless or continuous circulation while at the same time providing the required bearing support. As is well known in the landing gear art, the piston element 12 may either be restrained from relative rotational movement with respect to the cylinder element 11 by a suitable torque link or so-called "nutcracker" device, or as in the case of certain nose- and tail-wheel installations, the piston may be permitted to swivel fully or within certain limits which may be restricted by a suitable shimmy damping device or other known means. On the other hand, the wheel may be of the steerable type in which case the bearing 14 would be required to serve under both telescopic and rotary movements of the piston 12, and at times to operate under a combination of these two, as well as oscillatory movements.

Other forms and modifications of the present invention both with respect to its general arrangement and organization, as well as to the details of its component parts, will become obvious to those skilled in the art after reading the present specification, and are all intended to fall within the scope and spirit of the present invention, as more fully set forth in the appended claims.

We claim:

1. A rectilinear and rotary type bearing for a landing gear including a pair of relatively reciprocable and rotatable landing gear elements, a first of said landing gear elements having a shouldered bore and an annularly recessed portion, an annular ring having a plurality of angularly-spaced curved race portions in engagement with said shoulder, an annular guide element provided with a plurality of angularly-spaced axially-extending grooves arranged to provide ball return races, an annular sleeve element of uniform wall thickness having radially-extending angularly-spaced load race forming openings extending through its wall from its inner to its outer surface, said sleeve element adapted to fit within said guide element in race forming alignment with the grooves thereof, further annular retaining means having a plurality of angularly-spaced curved race portions adapted to cooperate with the first said annular ring in fixing said bearing within said recessed portion, and with the said grooves and openings of said guide and sleeve elements in providing a plurality of angularly-spaced longitudinally-extending ball bearing races, and a plurality of ball elements of greater diameter than said sleeve element wall thickness disposed in each said race adapted to circulate longitudinally and to transmit radial loads from the second said landing gear element through said ball elements to said guide element fixed within said first landing gear element.

2. A rectilinear anti-friction bearing for relatively reciprocating housing and cylindrical members, said bearing comprising an annular guide element adapted to telescopingly fit within a bored hub portion of said housing member, said guide element provided with a plurality of longitudinally-extending laterally-spaced return ball races, a sleeve element substantially co-extensive in length with and internally disposed within said guide element, said sleeve element provided with a plurality of laterally-spaced slots through the wall thereof to provide a plurality of inner ball races, retainer means disposed at the axial ends of said guide and sleeve elements in their telescoped relationship to fix said elements within said bored hub portion, and a plurality of ball elements adapted for continuous longitudinal circulation within said ball races in load-carrying contact between the cylindrical surface of said second member and said guide element.

3. In a rectilinear type bearing for the relatively movable piston and cylinder elements of an aircraft shock absorber strut, said cylinder element having an enlarged bored hub and shoulder portion, a guide element adapted for positioning within said cylinder hub bore arranged to define angularly-spaced longitudinally-extending outer return ball races, a sleeve element adapted to telescopingly fit within said guide element adapted to define in cooperation with said guide and piston elements angularly-spaced longitudinally-extending inner load-carrying ball races, retaining means disposed at each end of said telescoped guide and sleeve elements adapted to fix the same within said cylinder hub bore, and ball elements arranged for continuous circulation within said races in load-carrying contact with the cylindrical outer surface of said relatively movable piston element and said guide element.

4. A bearing comprising an outer member having a cylindrical bore, an inner cylindrical member adapted for relative movement within said outer member, an annular guide element provided with a plurality of angularly-spaced axially-extending grooves arranged to provide longitudinal ball return races, an annular sleeve element having radially-extending angularly-spaced race forming openings extending from its inner to its outer surface, said sleeve element adapted to fit within said guide element and annular retaining means disposed at each end of said telescoped guide and sleeve elements adapted to fix the said guide and sleeve elements within the cylindrical bore of said outer member, and ball elements arranged to circulate within said races in load-transmitting contact between the cylindrical surfaces of said inner member and said annular guide element.

5. In a rectilinear bearing for an offset cantilevered shock-absorbing strut, a pair of relatively movable inner and outer telescoping elements, said inner element having an uninterrupted cylindrical outer surface, said outer element having a bore portion terminating in a transverse shoulder, a guide element adapted for positioning within said outer element bore portion arranged to define a plurality of longitudinally-extending outer return ball races, a sleeve element adapted to slidingly fit within said guide element to define in cooperation therewith a plurality of longitudinally-extending inner load-carrying ball races, and retaining means disposed at the ends of said telescoped guide and sleeve elements adapted to fix their positions within said outer bore element portion against said transverse shoulder, and ball elements arranged for continuous circulation within said races in contact in their load-carrying condition with the uninterrupted cylindrical outer surface of said inner element and the inner face of said guide element.

6. An offset cantilever shock-absorbing strut, a rectilinear type bearing for the relatively movable telescoping inner and outer elements in the offset portion of said strut, the outer said element having an enlarged bore terminating in a shoulder portion, a guide element disposed within said outer bore arranged to define a plurality of longitudinally-extending outer return ball races, a sleeve element disposed to telescopingly fit within said guide element adapted to define in cooperation with said guide element and said inner strut element a plurality of longitudinally-extending inner load-carrying ball races, retaining means disposed toward the end of said outer element bore adapted to fix said guide and sleeve elements within said bore and against said shoulder, and ball elements within said races arranged for continuous circulation upon telescoping movement of the said inner and outer strut elements.

7. An aircraft landing gear comprising a cantilevered strut having its lower cylinder portion offset from the axis of its upper portion, a wheel-carrying piston element adapted for relative axial and rotational movement within the offset cylinder portion of said cantilever strut and a continuous race ball bearing housed within the lower portion of the cylinder portion of said cantilevered strut for reducing friction between said relatively moving piston and cylinder elements, the said bearing including a plurality of angularly spaced continuous races such that one or more such races are disposed to be in substantial alignment with a radial load irrespective of its direction.

8. The combination with an aircraft landing gear comprising a cantilevered strut having its lower cylinder portion offset from the axis of its upper portion and a wheel-carrying piston element arranged for relative axial and rotational movements within the offset cylinder portion of said cantilevered strut, of a continuous race ball bearing housed within the lower portion of the cylinder portion of said cantilevered strut for reducing the friction between said relatively moving piston and cylinder elements, the said bearing including a plurality of angularly spaced continuous races such that one or more such races are disposed to be in substantial alignment with a radial load irrespective of its direction.

9. An aircraft landing gear comprising a cantilevered strut having a lower cylinder portion offset from the axis of its upper portion, a piston element adapted for relative axial and rotational movements within the offset cylinder portion of said cantilevered strut, a wheel rotatively carried by said piston element in an offset relationship from the axis of said lower cylinder portion toward the axis of said upper strut portion and a continuous race ball bearing housed within the lower portion of the cylinder portion of said cantilevered strut for reducing friction between said relatively moving piston and cylinder elements, the said bearing including a plurality of angularly spaced continuous races such that one or more such races are disposed to be in substantial alignment with a radial load irrespective of its direction.

10. A rectilinear and rotary wheel mounting for an aircraft landing gear having a strut including a relatively movable upwardly extending piston element and a relatively fixed downwardly extending element, said fixed strut element supported from the aircraft and having an offset lower portion laterally displaced from and parallel to the axis of its upper supporting portion, said lower offset portion of said fixed strut element having a downwardly extending cylinder element formed therein, said piston element having a ground engaging means operatively associated therewith, said upwardly extending piston element and said downwardly extending cylinder element arranged for co-axial disposition within the offset portion of said strut, and a continuous race ball bearing housed within said fixed cylinder element arranged for circulation of the balls of said bearing in the axial direction of said strut with said balls in both axial and rotary anti-frictional engagement with said relatively movable piston element.

11. A rectilinear and rotary bearing for an aircraft landing gear strut having a relatively fixed offset cylinder portion, a relatively movable wheel-carrying piston portion adapted for telescopic movements in both rectilinear and rotational directions with respect to said fixed cylinder portion, said piston portion having an uninterrupted cylindrical outer surface portion, shock absorbing means associated with said strut portions arranged to resiliently oppose said axially telescopic movement, said bearing comprising a plurality of anti-friction ball bearing circuits housed within said fixed offset cylinder portion arranged for continuous circulation in the axial direction and in contact in their load-carrying condition with the uninterrupted cylindrical outer surface of said relatively movable piston portion.

12. In a landing wheel mounting for aircraft, an elongated strut depending from the craft, including a pair of relatively telescoping cylindrical members, a first of said strut members being fixedly attached at its upper portion and having a lower cylinder portion offset laterally from and parallel to the axis of its upper portion, the lower of said strut members having an upwardly extending piston portion adapted for rectilinear telescoping movements within said upper strut member cylinder portion, said lower strut member having a ground engaging element operatively associated therewith, and a continuous race ball bearing disposed between said telescoping strut piston and cylinder portions arranged for the continuous circulation of the ball elements of said bearing in the axial direction of said strut in anti-frictional engagement with the cylindrical surface of one of said relatively telescoping strut members.

13. A rectilinear and rotary bearing for an aircraft landing gear having a strut including an upper strut portion supported from the aircraft structure, an offset strut portion laterally displaced from and parallel to the axis of said upper strut portion, a relatively movable piston element having a ground-engaging wheel rotatably mounted thereon and shock-absorbing elements cooperatively carried by said offset strut portion and said relatively movable piston element arranged to resiliently oppose axially telescoping movements of said piston element within said strut offset portion, said bearing comprising a plurality of continuous ball races housed within said strut offset portion for circulation of the balls of said bearing in the axial direction of said strut and in axial and rotary anti-friction engagement with said movable piston element.

14. A rectilinear and rotary bearing for a cantilevered aircraft landing gear strut having an upper portion supported from the aircraft structure, an offset cylinder portion laterally displaced from and parallel to the axis of said strut upper portion, a relatively movable wheel-carrying piston portion arranged for axially telescopic movements with respect to said strut cylinder portion, and shock-absorbing elements arranged to oppose said telescopic movements, the extended axis of said upper strut portion passing substantially through the plane of symmetry of the wheel carried by said piston portion, said bearing including anti-friction ball bearing elements housed within said fixed offset cylinder portion for the telescopic axial and rotary movement of said movable piston portion therein.

15. A rectilinear bearing for an aircraft landing gear strut having an upper strut portion supported from the aircraft structure, an offset strut portion laterally displaced from and parallel to the axis of said strut upper portion, a piston portion arranged for axially telescopic movement with respect to said strut offset portion, a ground-engaging wheel carried by said piston portion arranged upon rolling contact with the ground to impart compression and bending forces to the landing gear strut, and shock-absorbing elements cooperatively carried by said strut offset portion and said wheel-carrying piston portion for resiliently opposing said compression forces, said bearing comprising a bearing assembly carried by one of said telescoping strut portions, continuous axially extending ball races carried entirely within said bearing assembly, ball elements arranged for free circulation within said races in anti-frictional contact with the other said telescoping strut portion, retaining means threadedly engaging one of said strut portions for the locking of the said bearing assembly therein and seal means carried by said retaining means for slidably engaging the other said telescoping strut portion.

16. A combined rectilinear and rotary bearing for an aircraft landing gear strut having upper and lower telescoping elements, the upper of said strut elements having a lower offset portion laterally displaced from and parallel to the axis of said upper portion of said upper element, the lower strut element having a piston portion arranged to telescopically and rotationally engage said offset portion, shock-absorbing means resiliently opposing the axial telescoping of said strut elements, said bearing comprising a continuous ball race assembly completely supported by one of said strut elements for telescopic and rotational anti-friction engagement by the other of said strut elements in such manner that the ball elements of said bearing are free to move in longitudinal paths substantially parallel to the said telescopic movement of the strut elements and said ball elements are also free to rotate transversely to permit relative rotational movements between said strut elements throughout the full axial movement of said telescoping strut elements as permitted by said shock-absorbing means.

17. A combined rectilinear and rotary bearing of the continuously circulating ball type comprising a housing member having a cylindrical bore, an inner cylindrical member within said cylindrical bore adapted for both rotative and reciprocating movement relative to said housing member, an annular guide element adapted to fit within said cylindrical bore, said guide element provided with a plurality of longitudinally-extending laterally-spaced return ball races, a sleeve element disposed to fit telescopingly within said guide element, said sleeve element provided with a plurality of laterally-spaced slots through the wall thereof to provide a plurality of inner ball races, means at opposite ends of the guide element for interconnecting the opposite ends of each longitudinally-extending ball race in the guide element to opposite ends of a slot in the sleeve element to provide thereby an endless ball circuit, and a plurality of ball elements adapted for continuous longitudinal circulation within each of said endless ball circuits in load-carrying contact between the cylindrical surfaces of said inner cylindrical member and said guide element.

18. A rectilinear and rotary bearing of the continuously circulating ball type comprising a housing member having a cylindrical bore, an inner cylindrical member within said cylindrical bore adapted for both rotative and reciprocating movement relative to said housing member, an annular guide element provided with a plurality of angularly-spaced axially-extending passages arranged to provide longitudinal ball return races, an annular sleeve element to fit slidingly within said guide element having radially-extending angularly-spaced race forming openings extending from its inner to its outer surfaces, annular end members disposed at opposite ends of the guide element for interconnecting the opposite ends of each longitudinal ball return race in the guide element to opposite ends of the race forming openings in the sleeve element to provide thereby an endless ball circuit, and ball elements arranged to circulate within each of said circuits in load-transmitting contact between the cylindrical surfaces of said inner cylindrical member and said annular guide element.

19. A rectilinear and rotary anti-friction bearing of the continuously circulating ball type comprising a housing member having a cylindrical bore, an inner cylindrical member within said cylindrical bore adapted for both rotating and reciprocating movement relative to said housing member, an annular guide element provided with a plurality of angularly spaced axially-extending passages arranged to provide longitudinal ball return races, an annular sleeve element to fit telescopingly within said guide element, said sleeve element having radially-extending angularly-spaced race forming openings provided through the thickness of the defining wall of the sleeve element to provide communication between the inner and the outer surfaces of the sleeve element, annular end members provided at the opposite ends of said guide element operative to prevent axial movement of said sleeve element, said annular end members having a plurality of angularly-spaced curved race portions adapted to cooperate with said axially-extending passages in the guide element and said race forming openings of the sleeve element to provide a plurality of endless ball circuits, and a plurality of ball elements of greater diameter than said sleeve element wall thickness disposed within each of said circuits to circulate longitudinally therein and to transmit radial loads from the inner cylindrical member through said ball elements to said guide element.

WENDELL E. ELDRED.
FREDERICK J. BOODY.

REFERENCES CITED

The following references are of record in the file of this patent:

UNITED STATES PATENTS

| Number | Name | Date |
|---|---|---|
| 1,094,972 | Bocorselski | Apr. 28, 1914 |
| 1,750,140 | Thompson | Mar. 11, 1930 |
| 1,964,319 | Gorton et al. | June 26, 1934 |
| 2,192,281 | Wallace | Mar. 5, 1940 |
| 2,198,039 | Onions et al. | Apr. 23, 1940 |
| 2,222,975 | Brown | Nov. 26, 1940 |
| 2,230,442 | Arms | Feb. 4, 1941 |
| 2,369,926 | Thornhill et al. | Feb. 20, 1945 |

FOREIGN PATENTS

| Number | Country | Date |
|---|---|---|
| 650,788 | Germany | Oct. 1, 1937 |
| 655,937 | Germany | Jan. 26, 1938 |
| 755,957 | France | Sept. 18, 1933 |